United States Patent
Itoh et al.

[11] Patent Number: 6,103,423
[45] Date of Patent: *Aug. 15, 2000

[54] NEGATIVE ELECTRODE FOR SECONDARY CELLS AND A NON-AQUEOUS ELECTROLYTE SECONDARY CELL COMPRISING THE SAME AS AT LEAST ONE ELECTRODE

[75] Inventors: Toshiki Itoh, Nagoya; Kenji Yamamoto, Okazaki; Eiichi Okuno, Gifu-ken; Hiroshi Ueshima, Anjo, all of Japan

[73] Assignee: Denso Corporation, Kariya, Japan

[*] Notice: This patent is subject to a terminal disclaimer.

[21] Appl. No.: 08/862,962

[22] Filed: Jun. 3, 1997

[30] Foreign Application Priority Data

Jun. 4, 1996 [JP] Japan .................... 8-141960

[51] Int. Cl.[7] .............. H01M 4/96; H01M 4/60

[52] U.S. Cl. .................. 429/231.8; 429/218.1; 429/233

[58] Field of Search ............... 429/218, 218.1, 429/231.8, 233

[56] References Cited

U.S. PATENT DOCUMENTS

| | | | |
|---|---|---|---|
| 5,028,500 | 7/1991 | Fong et al. | 429/194 |
| 5,225,296 | 7/1993 | Ohsawa et al. | 429/218 |
| 5,344,726 | 9/1994 | Tanaka et al. | 429/209 |
| 5,401,598 | 3/1995 | Miyabayashi et al. | 429/218 |
| 5,482,797 | 1/1996 | Yamada et al. | 429/218 |
| 5,494,762 | 2/1996 | Isoyama et al. | 429/194 |

FOREIGN PATENT DOCUMENTS

| | | |
|---|---|---|
| 4-368778 | 12/1992 | Japan . |
| 6-119939 | 4/1994 | Japan . |
| 6-132027 | 5/1994 | Japan . |

*Primary Examiner*—Maria Nuzzolillo
*Assistant Examiner*—Tracy Dove
*Attorney, Agent, or Firm*—Pillsbury Madison & Sutro Intellectual Property Group

[57] ABSTRACT

A negative electrode comprises carbon particles which individually consist of a core of crystalline carbon and an amorphous carbon layer formed on at least a part of the surfaces of the core, and an amorphous carbon matrix dispersing the carbon particles therein. The carbon matrix is formed by thermal decomposition of a thermosetting resin. A non-aqueous electrolyte secondary cell which comprises an electrode of the type mentioned above as at least one of electrodes is also described.

18 Claims, 1 Drawing Sheet

NEGATIVE ELECTRODE FOR SECONDARY CELLS AND A NON-AQUEOUS ELECTROLYTE SECONDARY CELL COMPRISING THE SAME AS AT LEAST ONE ELECTRODE

BACKGROUND OF THE INVENTION

1. Field of The Invention

This invention relates to a negative electrode for secondary cells which utilizes carbon as an active material therefor and also to a non-aqueous electrolyte secondary cell comprising at least one electrode made of a carbon active material of the type mentioned above.

2. Description of The Prior Art

When using fine particles of crystalline carbon as an active material for negative electrode, the density of electric capacity becomes high, but a charge efficiency lowers or the crystal structure of the carbon material is destroyed presumably owing to the decomposition of a liquid electrolyte. To avoid this, there has been made an attempt described, for example, in Japanese Laid-open Patent Application No. 4-368778. In this application, the fine particles of crystalline carbon are individually covered with amorphous carbon produced by thermal decomposition of a gas such as of a hydrocarbon. As a consequence, the lowering of a charge efficiency and destruction of the carbon material can be prevented, while keeping the density of electric capacity at a high level.

However, full coverage of the fine particles of carbon with amorphous carbon produced by the thermal decomposition of a hydrocarbon or a gas of a hydrocarbon compound is very difficult. Eventually, it is inevitable to lower the charge efficiency or to destroy the carbon material as will be probably caused by the decomposition of a liquid electrolyte. In this way, it has been difficult to obtain a negative electrode for secondary cells which exhibits a high density of electric capacity.

Japanese Laid-open Patent No. 6-132027 proposes a method wherein fine particles of carbon used as an active material are mixed with a thermosetting resin and the mixture is sintered or fired to permit the thermosetting resin to be carbonized, thereby covering individual fine particles with the resultant amorphous carbon. In this method, the amorphous carbon formed by the carbonization of a thermosetting resin is so porous that it is difficult to fully cover the surfaces of the fine particles of carbon with the amorphous carbon.

SUMMARY OF THE INVENTION

It is accordingly an object of the invention to provide a negative electrode for secondary cells which can appropriately prevent the lowering of a charge efficiency and the destruction of the crystal structure of a carbon material, both presumably resulting from the decomposition of the liquid electrolyte and which ensures a high density of electric capacity when applied to secondary cells.

It is another object of the invention to provide a non-aqueous electrolytic secondary cell comprising a negative electrode of the type mentioned above.

We have found that when fine particles of crystalline carbon are covered, to an extent as fully as possible, with amorphous carbon formed by decomposition of a hydrocarbon, and dispersing the resulting covered particles in a thermosetting resin, and subjecting the dispersed resin to carbonization to obtain a carbonized matrix having the fine particles substantially fully covered with amorphous carbon on the surfaces of individual fine particles of the carbon.

More particularly, according to one embodiment of the invention, there is provided a negative electrode which comprises carbon particles which individually consist of a core of crystalline carbon and an amorphous carbon layer formed on at least a part of the surfaces of the core, and an amorphous carbon matrix fixedly dispersing the carbon particles therein.

According to another embodiment of the invention, there is also provided a non-aqueous electrolyte secondary cell which comprises a pair of electrodes, a spacer provided between the paired electrodes, and a non-aqueous liquid electrolyte impregnated in the spacer, wherein at least one of the paired electrodes is made of carbon particles which individually consist of a core of crystalline carbon and an amorphous carbon layer formed on at least a part of the surfaces of the core, and an amorphous carbon matrix dispersing the carbon particles therein.

PREFERRED EMBODIMENTS OF THE INVENTION

Reference is now made to the accompanying drawing.

Figure 1:
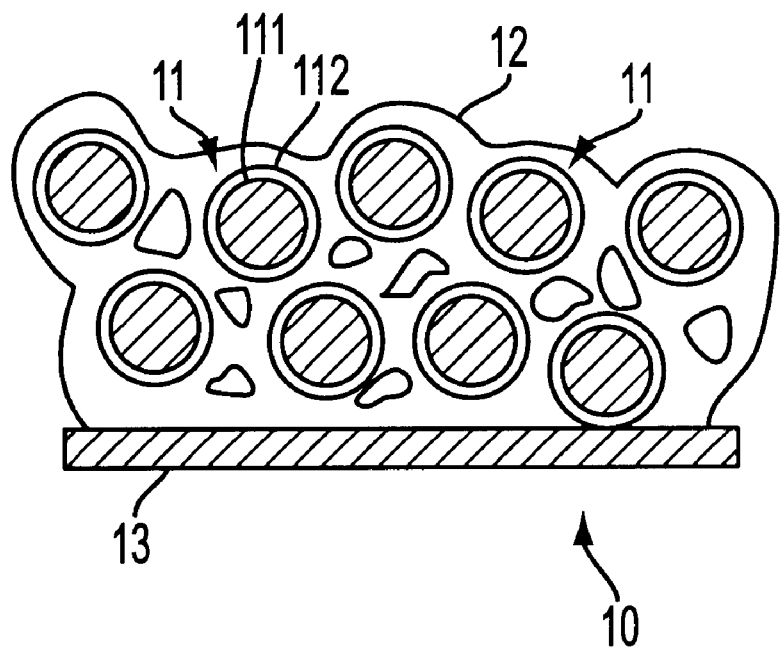
FIG. 1 is a schematic, enlarged view of part of a negative electrode for a secondary cell according to an embodiment of the invention.

FIG. 1 schematically shows part of a negative electrode which is adapted for use in secondary cells. The negative electrode is generally indicated at 10, and includes carbon particles 11 dispersed in an amorphous carbon matrix 12. The carbon particles 11 individually consist of a core 111 and an amorphous carbon layer 112 covering the core 111 therewith as shown. The carbon particles-dispersing matrix 12 may be disposed, for example, on an appropriate conductive substrate 13 such at a current collector made, for example, of copper.

The core 111 should be crystalline in nature and should be made of carbon having a highly crystalline graphite structure. Examples of such crystalline carbon include natural graphite, and artificial graphites such as mesophase carbon microbeads in the form of fine particles. The core should preferably have an average size of from 1 to 20 μm.

Individual cores 111 should be covered with the amorphous carbon layer 112 on at least a part thereof. This layer 112 is formed from an organic matter such as a hydrocarbon. Examples of the hydrocarbon include saturated or unsaturated hydrocarbons such as methane, propane, toluene, acetylene and the like. More particularly, the organic matter is thermally decomposed and carbonized to form an amorphous carbon layer on the core. The manner of the formation of the amorphous carbon layer is not critical. Such an amorphous layer may be formed by thermally decomposing an organic matter and permitting the resulting carbon to be deposited on fine particles of carbon serving as a core. Alternatively, the amorphous layer may be formed by depositing a carbon-containing component or compound on the surface of fine particles of carbon and then carbonizing the component. The carbonization is usually performed under conditions of 650 to 1000° C. for 10 to 50 hours. In short, any procedures of forming an amorphous carbon layer hitherto known in the art may be used in the practice of the invention. The amorphous carbon layer should preferably be formed by covering at least 50% of the core surfaces on average and should preferably have a layer thickness of 5 nm or above.

The thus covered carbon particles 11 preferably have an average size of from 1 to 20 μm. The particles 11 are dispersed in an amorphous carbon matrix.

The amorphous carbon matrix is formed by carbonization of a thermosetting resin. Examples of the thermosetting resin suitable for the practice of the invention include phenolic resins, furan resins, polyimide resins and the like. These resins nay be used singly or in combination. The carbon particles should preferably be present in an amount of 80 to 95 wt % based on the total of the carbon particles and the amorphous carbon matrix. The carbon matrix formed in this manner has a porous structure.

For use as a negative electrode of a secondary cell, the amorphous carbon matrix dispersing the carbon particles should be shaped in a desired form. For the shaping, the carbon particles and a thermoplastic resin are mixed to provide a mixture. The mixture is then shaped in the form of a disk, a cylinder or the like according to any known molding procedures such as molding by rolls, compression molding and the like. Alternatively a metallic current collector made, for example, of stainless steel or copper, is used, on which a paste of the mixture in an appropriate solvent for the resin is applied in a given thickness, followed by punching into a desired shape, curing and carbonizing the thermosetting resin in the mixture to obtain an electrode having a desired shape.

The carbonization is usually carried out in an atmosphere of an inert gas such as $N_2$ or argon and under conditions those described hereinabove.

Figure 2:
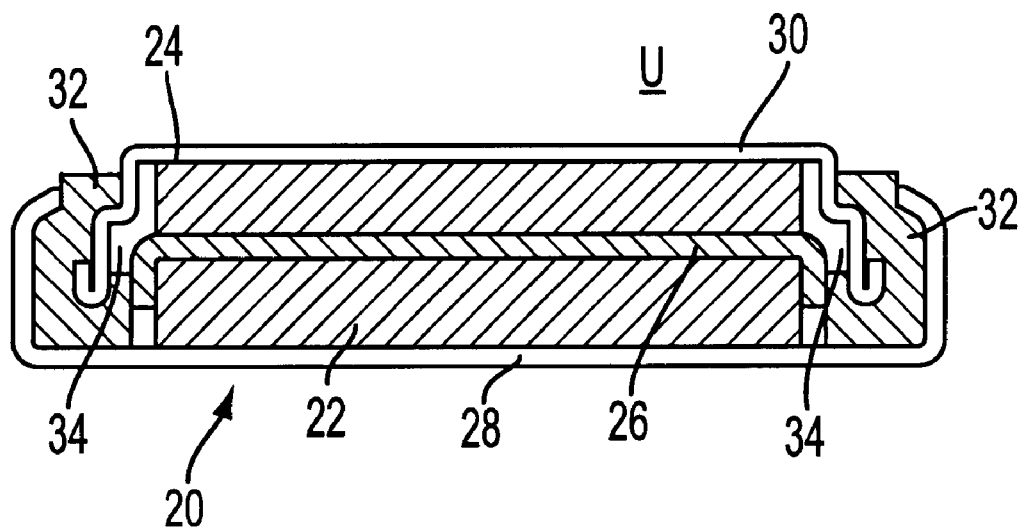
FIG. 2 is a schematic, longitudinal section of a non-aqueous electrolyte secondary cell using the negative electrode of FIG. 1.

FIG. 2 shows a button-shaped non-aqueous electrolyte secondary cell 20. The cell 20 has a cell unit U including a negative electrode 22, a positive electrode 24 and a separator 26 interposed between the electrodes 22, 24. A non-aqueous electrolyte 34 is impregnated in the separator 26. The cell unit U is encased in a casing made of a negative electrode can 28 and a positive electrode can 30 which are sealed with a sealing and electric insulating gasket 32 as shown.

In the practice of the invention, at least one of the electrodes 22, 24 is made of an electrode of the type having set out hereinabove. More particularly, at least one electrode should be made of an amorphous carbon matrix dispersing carbon particles which are individually made of a core of crystalline carbon and an amorphous carbon layer formed on at least a surface thereof. Preferably, at least one electrode should be a negative electrode, or both electrodes should be made of an electrode of the type having illustrated before as a negative electrode. If the at least one electrode is a negative electrode, positive electrode may be made, for example, of a lithium-containing metal oxide or composite oxide, or a lithium alloy as is known in the art.

The separator 26 may be any ones known in the art and includes, for example, polyolefin non-woven fabrics.

The button-shaped cell has been illustrated above, and the cell may be in the form of a disk, a cylinder, a square or rectangle or the like.

The non-aqueous electrolyte should preferably be made of a mixture of a high-dielectric solvent and an electrolyte, or a mixture of a high-dielectric solvent, a low viscosity solvent and an electrolyte. Preferred examples of the high-dielectric solvent include propylene carbonate because of its good low temperature characteristics. Examples of the low viscosity solvent include diethyl carbonate (DEC), dimethyl carbonate (DMC), dimethoxyethane (DME) and mixtures thereof. Examples of the electrolyte include lithium perchlorate ($LiClO_4$), lithium hexafluorophosphate ($LiPF_6$) and the like. The content of an electrolyte in a liquid electrolyte is generally in the range of 0,5 moles/liter to 2.0 mole/liter.

When using the negative electrode of the invention, the active material which is made of carbon particles each consisting of a crystalline carbon core covered with an amorphous carbon layer is excellent in conductivity, thus ensuring a high electrode capacity. The core of crystalline carbon is fully covered with amorphous carbon, so that there is little chance that the core contacts directly with a liquid electrolyte. Thus, a benefit that the lowering of a charge efficiency and the destruction of the crystal structure of the carbon material which would probably be caused by the decomposition of the electrode is prevented. In this manner, a high density of electric capacity is ensured.

The present invention is more particularly described by way of example.

EXAMPLE

A button-shaped non-aqueous secondary cell of the type shown in FIG. 2 was made. The cell 20 was constituted of a negative electrode 22 made of carbon cores each having an amorphous carbon layer and dispersed in an amorphous carbon matrix, a positive electrode made of $LiCoO_2$ and a separator 26 made of a polyolefin non-woven fabric and interposed between the electrodes 22, 24. The separator 26 was impregnated with an electrolyte comprising lithium perchlorate dissolved in a mixed solvent of propylene carbonate and diethyl carbonate at a concentration of 1 mole/liter. The resulting cell unit U was encased in a casing made of negative and positive electrode cans 28, 30 and electrically insulated and sealed with a gasket 32.

In the above cell, the negative electrode 22 was made of a carbon electrode of the type shown in FIG. 1. More particularly, 3 kg of mesophase carbon microbeads (MCMB) having an average size of 6 μm was provided and placed in a cylindrical reactor tube having a diameter of 1 mm. The beads were agitated in reactor tube rotated at about 5 r.p.m., in an atmosphere of a mixed gas of propane gas and nitrogen gas having a concentration of the propane gas of 25% by volume to make a fluidized state. Under these conditions, the reactor tube was heated to 750° C. for 10 hours. In this way, the beads were individually formed on the surface thereof with a 20 nm thick amorphous carbon layer to obtain carbon particles 11 each having a core 11 having an amorphous carbon layer 112. The core 111 was covered with almost 90% of the surfaces thereof with the amorphous carbon layer 112.

Thereafter, the carbon particles 11 and a phenolic resin were mixed at a ratio by weight of 9:1, to which N-methylpyrrolidone (NMP) was added thereby obtaining a paste. This paste was applied onto a copper current collector 13 and dried at 80° C. for 1 hour and punched to obtain a disk-shaped electrode having a diameter of 15 mm. The disk was hot pressed at a compression pressure of 3 tons/cm$^2$ at 150° C. for 1 minute to thermally cure the thermosetting resin. The cured disk was placed in a firing furnace and heated at a rate of 100° C./hour in an atmosphere of $N_2$ gas to a temperature of 750° C., at which it was fired for 2.5 hours to permit the phenolic resin to be carbonized thereby providing a porous amorphous carbon matrix 12. In this manner, the negative electrode 22 was made. The amount of the phenolic resin left as or converted to carbon reached about 60%. Accordingly, the ratio by weight between the carbon particles and the amorphous carbon matrix formed after the firing was found to be 90:6,3

The resultant secondary cell was subjected to measurement of a discharge capacity under measuring conditions wherein the cell was charged under constant current and constant voltage conditions of a constant current of 1.02 mA/m$^2$, a maximum voltage of 4.2 V and a time of 10 hours and discharged under constant current conditions of 1.02 mA/m$^2$ and 2.75 V.

As a result, it was found that the discharge capacity was 242 mAh/g.

For comparison, three types of negative electrodes were made. Using these negative electrodes, three types of secondary cells were made in the same manner as in the example except that different types of negative electrodes were used.

Comparative Example 1

90 parts by weight of MCMB used as the core of the example was mixed with 10 parts by weight of a polyvinylidene fluoride binder (PVDF). N-methylpyrrolidone was added to the resulting mixture to obtain a paste, followed by coating onto a Cu current collector and drying at 80° C. for 1 hour and punching into a disk-shaped electrode having a diameter of 15 mm. The electrode was pressed at normal temperatures at a compression pressure of 3 tons/cm$^2$ for 1 minute to obtain an electrode. This electrode was used to assemble a secondary cell in the same manner as in the example.

Comparative Example 2

In this comparative example, the carbon particles made in the example were used as a carbon active material. That is, carbon particles 11 each consisting of a core 111 made of MCMB and an amorphous carbon layer 112 were used as they are. 90 parts by weight of the carbon particles were mixed with 10 parts by weight of PVDF as used in Comparative Example 1 to obtain a mixture. This mixture was further mixed with N-methylpyrrolidone to obtain a paste, followed by coating onto a Cu current collector and drying at 80° C. for 1 hour and punching into a disk-shaped electrode having a diameter of 15 mm. The electrode was pressed at normal temperature at a compression pressure of 3 tons/cm$^2$ for 1 minute to obtain an electrode. This electrode was used to assemble a secondary cell in the same manner as in the example.

Comparative Example 3

MCMB and a phenolic resin were mixed at a ratio by weight of 9:1, followed by further addition of N-methylpyrrolidone to obtain a paste. Then, in the same manner as in the example, the paste was applied onto a Cu current collector and dried at 80° C. for 1 hour, followed by punching into a disk-shaped electrode having a diameter of 15 mm. The disk was cured by means of a hot press under conditions of 3 tons/cm$^2$, 150° C. and 1 minute. This electrode was placed in a firing furnace and heated at a rate of 100° C./hour in an atmosphere of N$_2$ gas to 750° C., at which the electrode was maintained for 2.5 hours to carbonize the phenolic resin thereby forming a porous, amorphous carbon matrix dispersing the MCMB therein. This electrode was used to assemble a secondary cell in the same manner as in the example.

The secondary cells using the negative electrodes of Comparative Examples 1 to 3 were subjected to measurement of a discharge capacity in the same manner as in the example. As a result, it was found that the discharge capacity of the cells of Comparative Examples 1, 2 was 0 mAh/g and these cells did not function as a cell. The cell of Comparative Example 3 had a discharge capacity which was ⅔ of that of the example.

As will be apparent from the above example and comparative examples, the amorphous carbon matrix of the example is porous and a liquid electrolyte can impregnate in the pores of the matrix. The cores which are made of crystalline carbon are substantially covered with an amorphous carbon layer formed by thermal decomposition of propane and further with the amorphous carbon matrix although porous. In this way, there is little chance that individual cores directly contact with a liquid electrolyte on the surfaces thereof.

More particularly, the degree of coverage of the cores with the amorphous carbon may differ depending on the layer-forming conditions. Even if the core surfaces are covered with the amorphous carbon layer only at 80% thereof, the carbon particles each consisting of the core and the amorphous carbon layer are further covered with an amorphous carbon matrix. Eventually, individual cores will be covered on the surfaces thereof at a rate of 88 to 96% as a whole. This high coverage is sufficient to suppress the decomposition of a liquid electrolyte by reaction with crystalline carbon as will be caused by charge and discharge cycles, thus ensuring a high discharge capacity.

What is claimed is:

1. A negative electrode comprising:
   a metallic current collector; and
   an active substance layer of an amorphous carbon matrix deposited on said metallic current collector, wherein the amorphous carbon matrix disperses and holds therein composite carbon particles individually consisting of a core of crystalline carbon and an amorphous carbon layer formed on at least a part of the surfaces of said core.

2. A negative electrode according to claim 1, wherein said carbon particles have an average size of from 1 to 20 $\mu$m.

3. A negative electrode according to claim 1, wherein said amorphous carbon matrix is porous and covers said cores at surfaces thereof where not covered with said amorphous carbon layer.

4. A negative electrode according to claim 1, wherein said carbon particles are present in an amount of from 80 to 95 wt % based on the total of said carbon particles and said amorphous carbon matrix.

5. A non-aqueous electrolyte secondary cell comprising:
   a pair of positive and negative electrodes,
   a spacer provided between the paired positive and negative electrodes; and
   a non-aqueous liquid electrolyte impregnated in the spacer, wherein at least one of the paired positive and negative electrodes includes a metallic current collector and an active substance layer of an amorphous carbon matrix deposited on said metallic current collector, wherein the amorphous carbon matrix disperses and holds therein composite carbon particles individually consisting of a core of crystalline carbon and an amorphous carbon layer formed on at least a part of the surfaces of said core.

6. A non-aqueous electrolyte secondary cell according to claim 5, wherein said non-aqueous liquid electrolyte comprises a mixture of a high-dielectric solvent and an electrolyte.

7. A non-aqueous electrolyte secondary cell according to claim 6, wherein said high-dielectric solvent consists of propylene carbonate.

8. A non-aqueous electrolyte secondary cell according to claim 5, wherein said non-aqueous liquid electrolyte comprises a mixture of a solvent of a high-dielectric, a low viscosity solvent and an electrolyte.

9. A non-aqueous electrolyte secondary cell according to claim 8, wherein said high-dielectric solvent consists of propylene carbonate and said low viscosity solvent consists of diethyl carbonate, dimethyl carbonate, dimethoxyethane and mixtures thereof.

10. A non-aqueous electrolyte secondary cell according to claim 5, wherein said amorphous carbon matrix is made of a carbonized product of a thermosetting resin, and said thermosetting resin includes at least one member selected from the group consisting of phenolic resins, furan resins, and polyimide resins.

11. A non-aqueous electrolyte secondary cell according to claim 5, wherein said core consists of a mesophase carbon microbead.

12. A non-aqueous electrolyte secondary cell according to claim 5, wherein said amorphous carbon layer is formed from a hydrocarbon.

13. A non-aqueous electrolyte secondary cell according to claim 12, wherein said hydrocarbon is at least one member selected from the group consisting of methane, propane, acetylene and toluene.

14. A negative electrode according to claim 1, wherein said amorphous carbon matrix comprises a carbonized product of a resin.

15. A negative electrode according to claim 14, wherein said resin comprises a thermosetting resin selected from the group consisting of phenolic resins, furan resins, and polyimide resins.

16. A negative electrode according to claim 14, wherein said amorphous carbon matrix is porous.

17. A non-aqueous electrolyte secondary cell according to claim 5, wherein said amorphous carbon matrix comprises a carbonized product of a resin.

18. A non-aqueous electrolyte secondary cell according to claim 10, wherein said amorphous carbon matrix is porous.

* * * * *